(12) United States Patent
Abbruzzesi et al.

(10) Patent No.: US 12,187,274 B2
(45) Date of Patent: Jan. 7, 2025

(54) METHOD FOR AVOIDING A COLLISION IN ROAD TRAFFIC ON THE BASIS OF ADAPTIVELY SETTING POTENTIALLY OCCUPIED AREAS

(71) Applicant: Valeo Schalter und Sensoren GmbH, Bietigheim-Bissingen (DE)

(72) Inventors: Fabio Abbruzzesi, Bietigheim-Bissingen (DE); Michael Wuttig, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 278 days.

(21) Appl. No.: 17/640,529

(22) PCT Filed: Aug. 5, 2020

(86) PCT No.: PCT/EP2020/071959
§ 371 (c)(1),
(2) Date: Mar. 4, 2022

(87) PCT Pub. No.: WO2021/047827
PCT Pub. Date: Mar. 18, 2021

(65) Prior Publication Data
US 2022/0332313 A1 Oct. 20, 2022

(30) Foreign Application Priority Data
Sep. 9, 2019 (DE) ...................... 10 2019 124 118.9

(51) Int. Cl.
*B60W 30/095* (2012.01)
(52) U.S. Cl.
CPC .................. *B60W 30/0956* (2013.01); *B60W 2420/403* (2013.01); *B60W 2420/408* (2024.01);
(Continued)

(58) Field of Classification Search
CPC ....... B60W 30/0956; B60W 2420/403; B60W 2420/408; B60W 2520/10;
(Continued)

(56) References Cited

U.S. PATENT DOCUMENTS

| | | | | |
|---|---|---|---|---|
| 9,031,758 | B1 * | 5/2015 | Goudy | ............... G08G 1/09626 701/70 |
| 2018/0099665 | A1 * | 4/2018 | You | ................... B60W 30/0956 |

FOREIGN PATENT DOCUMENTS

| | | | |
|---|---|---|---|
| DE | 102007055799 A1 | 7/2008 | |
| DE | 102013101079 A1 * | 8/2013 | ............ B60W 50/06 |

(Continued)

OTHER PUBLICATIONS

Office Action issued in Japanese Application No. 2022-515559 mailed on Jun. 13, 2023 (11 pages).
International Search Report and Written Opinion in corresponding International Application No. PCT/EP2020/071959, mailed Dec. 1, 2020 (12 pages).
(Continued)

*Primary Examiner* — Peter D Nolan
*Assistant Examiner* — Anwar Mohamed
(74) *Attorney, Agent, or Firm* — Osha Bergman Watanabe & Burton LLP

(57) ABSTRACT

The present invention relates to a method for avoiding collisions of a moving vehicle with other road users in the surroundings of the vehicle, comprising at least the method steps of: a) detecting, by means of one or more sensors, the vehicle surroundings and the other road users located therein; b) dividing the vehicle surroundings into a plurality of occupied areas; c) classifying the other road users detected in method step a), wherein, by means of the classification, at least one road user group is assigned to each of the other road users; d) prioritising the road user classified in method step c), taking into account both the classification carried out in method step c) and the occupied area defined in method step b), wherein road users from one or more (Continued)

predetermined road user groups in the particular occupied area are given a high priority and road users from other, non-predetermined road user groups in the particular occupied area are given a lower priority; and e) determining the probability of collision of the other road users with the vehicle, wherein the collision probability is determined in accordance with the prioritisation carried out in method step d) and the collision probability of the other road users having a high priority is determined first; f) changing or maintaining the current driving behaviour of the vehicle on the basis of the collision probabilities determined in method step e).

11 Claims, 4 Drawing Sheets

(52) U.S. Cl.
CPC .............. *B60W 2520/10* (2013.01); *B60W 2554/4026* (2020.02); *B60W 2554/4029* (2020.02); *B60W 2556/40* (2020.02); *B60W 2556/45* (2020.02)

(58) Field of Classification Search
CPC .............. B60W 2554/4026; B60W 2554/4029; B60W 2556/40; B60W 2556/45
See application file for complete search history.

(56) References Cited

FOREIGN PATENT DOCUMENTS

| | | |
|---|---|---|
| DE | 102014204383 A1 | 9/2015 |
| DE | 102015224338 A1 | 6/2017 |
| DE | 102017103700 A1 * | 8/2018 |
| DE | 102018208105 B3 | 3/2019 |
| EP | 2528049 B1 | 1/2014 |
| EP | 2626268 B1 | 10/2018 |
| JP | 2010-009232 A | 1/2010 |

OTHER PUBLICATIONS

German Search Report issued in corresponding German Application No. 10 2019 124 118.9, dated Jan. 24, 2020 (5 pages).

* cited by examiner

METHOD FOR AVOIDING A COLLISION IN ROAD TRAFFIC ON THE BASIS OF ADAPTIVELY SETTING POTENTIALLY OCCUPIED AREAS

The present invention relates to a method for avoiding collisions of a moving motor vehicle with other road users in the surroundings of the vehicle, comprising at least the method steps of:
a) detecting, by means of one or more sensors, the vehicle surroundings and the other road users located therein;
b) dividing the vehicle surroundings into a plurality of potentially occupied areas;
c) classifying the other road users detected in method step a), wherein, by means of the classification, at least one road user group is assigned to each of the other road users;
d) prioritizing the road users classified in method step c), taking into consideration both the classification carried out in method step c) and the potentially occupied area defined in method step b), wherein road users from one or more predetermined road user groups in the particular potentially occupied area are given a high priority and road users from other, non-predetermined road user groups in the particular potentially occupied area are given a lower priority; and
e) determining the probability of collision of the other road users with the vehicle, wherein the collision probability is determined in accordance with the prioritization carried out in method step d), and the collision probability of the other road users having a high priority is determined first;
f) changing or maintaining the current driving behavior of the vehicle on the basis of the collision probabilities determined in method step e). The present invention furthermore relates to a driving assistance system configured to carry out the method according to the invention, and to a vehicle with a system configured in that way.

One approach to simplifying today's typical traffic situations consists in offloading complex activities that require close attention to the vehicle or vehicle systems themselves. In the past, such a procedure could only be implemented with great difficulty, since the technical possibilities of the available sensors were limited, and functional solutions were accordingly not present or were economically unsupportable. For many types of sensor, these disadvantages have been overcome in recent years, so that, in principle, economical, high-performance sensors are available with which an adequate digital image can be prepared even for complex traffic situations. It is, however, disadvantageous, that the sensors tend to provide too much data rather than too little, so that the downstream data processing acquires greater and greater significance. The last statement applies even more acutely to traffic monitoring tasks in which a large number of different traffic groups, having different movement profiles and possibilities, are present. The reduction and structuring of the available data down to the most important features within an extremely short time is thus one of the fundamental preconditions for obtaining, autonomously or semi-autonomously, correct and safe decisions from the systems involved.

A large number of different approaches to monitoring current traffic situations exists in the patent literature.

Thus, for example, EP 2 528 049 B1 describes a method and an apparatus for acquiring safety-critical objects at a vehicle, making use of a navigation apparatus, wherein safety-critical objects represent potential obstacles for the vehicle or the traffic signs that are critical for driving the vehicle. The vehicle is equipped with the apparatus and the method of the present invention, and is furthermore equipped with a navigation apparatus and an image acquisition apparatus. The method of the present invention uses navigation data that are available from the navigation apparatus, and an image of the surroundings of the vehicle that is acquired by the image acquisition apparatus for acquiring the safety-critical objects for the vehicle. The method of the present invention furthermore estimates the visual attentiveness of a driver of the vehicle to the safety-critical objects that have been acquired, and generates an appropriate warning for the driver depending on the driver's estimated visual attentiveness.

EP 2 626 268 B1 furthermore discloses a method for the protection of an object disposed outside a vehicle, characterized by the following steps:
a) detecting an obstacle, in particular the position of the obstacle, in the surroundings of the vehicle by a suitable sensor system,
b) ascertaining the driving movement of the vehicle,
c) calculating a driving envelope for the object arranged outside at the vehicle,
d) ascertaining a possible collision of the object arranged outside at the vehicle with the obstacle by comparing the driving envelope with the position of the obstacle.

DE10 2014 204 383 A1 finally discloses a driver assistance system for object recognition for a vehicle, wherein the driver assistance system comprises:
a processor; a sensor for acquiring individual images of the surroundings of the vehicle; wherein the processor is designed to select a region from a simulated criticality map as a region of interest to examine for critical objects; wherein the simulated criticality map comprises a plurality of regions, and a respective latency time is assigned in the criticality map to each of these regions; wherein the latency time corresponds to the duration of the maximum period during which the driver assistance system can leave the respective region of the criticality map uninvestigated; and wherein the processor is designed to select the region of interest on the basis of the associated latency time.

Solutions of this type known from the prior art can offer further potential for improvement, in particular in respect of a method that is able to quickly and reproducibly filter the data relevant for the current traffic situation out of a complex and confusing data assemblage and to reduce it to the important road users.

It is the object of the present invention to at least partially overcome the disadvantages known from the prior art. It is, in particular, the object of the present invention to provide a solution that enables data processing of sensor data, even in more complex traffic situations, in real time and using relatively few resources.

The object is achieved through the features of the respective independent claims, oriented to the method according to the invention, to the driving assistance system according to the invention and the vehicle according to the invention. Preferred embodiments of the invention are described in the dependent claims, in the description or the figures, wherein further features described or shown in the dependent claims or in the description or the figures can represent a subject of the invention individually or in any combination, unless the context clearly indicates the opposite.

According to the invention, a method for avoiding collisions of a moving vehicle with other road users in the surroundings of the vehicle is proposed, wherein the method comprises at least the method steps of:

a) detecting, by means of one or more sensors, the vehicle surroundings and the other road users located therein;
b) dividing the vehicle surroundings into a plurality of potentially occupied areas;
c) classifying the other road users detected in method step a), wherein, by means of the classification, at least one road user group is assigned to each of the other road users;
d) prioritizing the road users classified in method step c), taking into consideration both the classification carried out in method step c) and the potentially occupied area defined in method step b), wherein road users from one or more predetermined road user groups in the particular potentially occupied area are given a high priority and road users from other, non-predetermined road user groups in the particular potentially occupied area are given a lower priority; and
e) determining the probability of collision of the other road users with the vehicle, wherein the collision probability is determined in accordance with the prioritization carried out in method step d), and the collision probability of the other road users having a high priority is determined first;
f) changing or maintaining the current driving behavior of the vehicle on the basis of the collision probabilities determined in method step e).

Such a method can have significant advantages over the solutions from the prior art, in particular in respect of the processing speed and the resources requirements. Through the driving guidance according to the invention, the road users are grouped or classified into different groups, and the differing potentially occupied areas around the vehicle are not evaluated as such, but depending on the group classification. A spatial and a type-weighted component are thus merged. Through this merging, the data relating to those road users that represent any danger of a possible collision in the current driving situation can be filtered out particularly quickly. The other road users, those that either do not fall into one of the prioritized groupings in the potentially occupied area under consideration, also known as the ROI (region of interest), or that are located in irrelevant potentially occupied areas around the vehicle, are processed by the method with a lower priority. As a result of this prioritization, data relating to truly relevant road users in the surroundings of the vehicle are more quickly available. As a result of the method, the vehicle, or the vehicle driver, can thus react more quickly to potential collision risks and, accordingly, also take measures more quickly to effectively avoid such a collision risk. A highly efficient method for avoiding accidents can thus be created with a minimum use of resources. In comparison with the prior art, shorter intervention times can be realized, and fewer fast systems used for data processing.

The method according to the invention is a method for avoiding collisions of a moving vehicle with other road users in the surroundings of the vehicle. In the sense of the invention, collisions are unwanted physical contacts between different road users such as, for example, a collision between two vehicles or between a vehicle and a pedestrian. This type of collision is usually referred to as an accident. Vehicles here can in particular be motor-driven motor vehicles such as, for example, cars, buses or trucks. The vehicle is in motion here if it has a minimum speed that is not equal to 0 km/h. The further road users are, for example, pedestrians, cyclists or other vehicles. The vehicle surroundings of the vehicle can, for example, be defined as the surroundings that extend around the vehicle within the range of the sensors that are in use. The vehicle surroundings can, for example, be formed by the roads and paths surrounding the vehicle and, together with the fixed structures such as, for example, houses, extend radially around the vehicle, wherein the radius can preferably be 500 m, furthermore preferably 300 m, and again preferably 250 m.

In method step a) the detection of the vehicle surroundings and the other road users located therein takes place by means of one or more sensors. A digital image of the current traffic situation surrounding the vehicle is acquired through the use of one or a plurality of sensors, and at least the position and the current direction of movement of the different road users in the vehicle surroundings are determined. In addition, the road layout in the vehicle surroundings can be determined by means, for example, of GPS sensors, so that, taken together, a digital image of the roads, including the other road users that are in that area, results. Possible sensors are, for example, lidar, ultrasonic or radar sensors, or optical cameras that, individually or merged, digitally map the traffic surroundings. It is possible that the different sensors are attached to different positions on the vehicle, so that the different sensors each monitor different segments of the vehicle surroundings. The sensors can, additionally, monitor the vehicle surroundings at regular time intervals, so that not only the instantaneous position of the further road users, but also their own movement or change of location as a function of time is acquired.

In method step b) a division of the vehicle surroundings into a plurality of potentially occupied areas takes place. The vehicle surroundings that can be acquired by the sensors are thus divided into different spatial areas, wherein the respective areas differ in their location coordinates. The potentially occupied areas can, for example, be divided as a function of the vehicle movement into a rear, front and two side areas, wherein the respective areas extend out from the corresponding vehicle axes. The potentially occupied areas can also, however, be defined as a function of the respectively present sensors, and extend more or less symmetrically away from the vehicle into the sensor space. The definition of the potentially occupied areas can also take place dynamically, for example as a function of the speed of the vehicle or alternatively as a function of the time of day or the lighting situation. Preferably, more than two, further preferably more than four and further preferably more than six different potentially occupied areas can be defined here for one vehicle surroundings. The different potentially occupied areas do not here have to be the same size, and they also do not have to be extend symmetrically around the vehicle. It is, furthermore, possible that the potentially occupied areas are selected as a function of the sensor ranges and as a function of the current road and surroundings map. Examples of different potentially occupied areas are shown in the figures.

In method step c) a classification of the other road users detected in method step a) takes place, wherein, by means of the classification, at least one road user group is assigned to each of the other road users. In addition to the road configuration, the presence of further road users in the vehicle surroundings is also established by the sensors. In this step, the individual further road users are each assigned to a group; they are classified. The assignment to a group can, for example, take place with reference to the movement profile, the instantaneous speed, or also on the basis of the size of the objects. A classification can expediently take place on the basis of the movement profile, allowing, for example, road user groups such as pedestrians, cyclists, cars, trucks, buses, e-scooters, motorbikes and so forth to be distinguished.

These road user groups are characterized by different mobilities or speeds, and can thereby be collected into respectively uniform groups.

In method step d) a prioritization of the road users classified in method step c) takes place, taking into consideration both the classification carried out in method step c) and the potentially occupied area defined in method step b), wherein road users from one or more predetermined road user groups in the particular potentially occupied area are given a high priority and road users from other, non-predetermined road user groups in the particular potentially occupied area are given a lower priority. The prioritization of the individual, other road users thus takes place having merged both the local assignment to a specific potentially occupied area with simultaneous consideration of the classification carried out previously. Thus, for example, a prioritization of very close road users in the same potentially occupied area can result in them being recognized as having a different value, i.e. a different priority, for the current driving situation. For example, within a common area close to the vehicle, those road users that are moving particularly fast, such as other vehicles or motorcycles, are preferably singled out. These are assigned to the respective classes, and, due to their physical vicinity and the class to which they belong, receive a high priority for the method. On the other hand, a lower priority in comparison to other motor vehicles can be assigned to, for example, pedestrians in relatively distant potentially occupied areas.

In method step e) a determination of the probability of collision of the other road users with the vehicle is made, wherein the collision probability is determined in accordance with the prioritization carried out in method step d) and the collision probability of the other road users having a high priority is determined first. The determination of the importance of the other road users detected takes place within the method according to the invention depending on the assigned priority. If a road user is located within a defined potentially occupied area and it belongs to a predefined class, then it will be treated earlier by the method than the other road users that have a lower priority. The other road users in other groups are thus not considered until the time at which the treatment of the road users belonging to the prioritized groups has been completed. It is thus, for example, possible that the pedestrians in a potentially occupied area that is far away are not treated by the method at all, since the risk of collision associated with these distant pedestrians is negligible. In the case according to the invention, the prioritization enables a temporal graduation in the processing and/or a specification of whether these road users are considered at all in the context of the method.

In method step f), a change or retention of the current driving behavior of the vehicle takes place on the basis of the collision probabilities determined in method step e). On the basis of the current potentially occupied areas and of the road users detected therein, as well as the classes to which they belong, a collision probability is thus determined, and this can give rise to a change in the current driving behavior. If the collision probability is high, then, for example, a warning can be output to the vehicle driver, or the acceleration can be reduced, or an autonomous braking action can be initiated. If the collision probability indicates a non-hazardous traffic situation, then, for example, the current driving behavior can be retained. The decision as to whether to change or retain the current driving behavior can, also, be affected by further influencing factors such as, for example, flashing and/or steering actions of the vehicle. Changes to the immediately upcoming driving situation of the vehicle induced by the vehicle driver can in this way also be taken into consideration.

In one preferred embodiment of the method, the division of the potentially occupied areas in method step b) can take place making use of a surroundings map of the current vehicle surroundings of the vehicle. In addition to the sensor-supported selection of the potentially occupied areas, the inclusion of reference to a current surroundings map can in particular contribute to a division of the potentially occupied areas that is more appropriate for the situation. The road layout in the surroundings of the vehicle can in particular contribute here to identifying particular hazardous locations such as, for example, crossroads or junctions and to giving a particular weight to these locations in the definition of the potentially occupied areas. When, for example, on a freeway, the areas lying in the direction of travel can be more heavily divided, and the areas to the side and rear given relatively low consideration. This can lead to a particularly specific, and thereby risk-adapted distribution of the potentially occupied areas.

In a further preferred embodiment of the method, the division of the vehicle surroundings in method step b) can be done as a function of the speed of the vehicle. It has been found particularly advantageous for the division of the different potentially occupied areas to be chosen not only as a function of the sensor ranges, but also as a function of the current vehicle speed. By including the current vehicle speed, driving on typical urban, long-distance roads, or freeways can be distinguished, for example, wherein the potential hazards of the different road user groups correspond to these situations. A particularly fast and adaptive method can be carried out in this way.

In one preferred aspect of the method, furthermore, the division of the vehicle surroundings in method step b) takes place symmetrically with respect to the vehicle movement direction in at least 3 different potentially occupied areas. To achieve the fastest possible system that enables an adequate distinction and distribution of the potentially occupied areas and other road users even in complex traffic situations, a division into 3 areas has been found to be particularly efficient. The method flows are thus optimized particularly well, while a secure distinction between different road users is also ensured.

In the context of a further design of the method, the prioritization of the other road users in method step d) takes place while additionally giving consideration to the current movement profile of the other road user. In addition to the static classification into the different classes of road users, the inclusion of the current movement pattern of the other road users can make a further contribution to the situationally appropriate prioritization of the road user and the subsequent risk evaluation. Thus for example, unmoving pedestrians can be discounted in the risk evaluation or can be given a lower priority. In this method step, the latter would enable a distinction between different pedestrians in a potentially occupied area. For instance, whether the pedestrian is moving toward the vehicle or away from it can also be included in the prioritization. Depending on the weighting of these further factors, the individual pedestrian in the potentially occupied area can then receive a higher or lower priority. This step can contribute to a further situationally appropriate differentiation in the context of the method according to the invention.

Within a preferred characteristic of the method, it is possible not to carry out the determination of the collision probability in method step e) for other road users with lower priority. To create a method that permits particularly fast decisions with a high degree of safety, it has been found to be advantageous if the road user that has been given a low priority is simply not considered in the further progress of the method. This can further accelerate the method processing, and can provide resources more quickly for the relevant other road users.

In a further, preferred embodiment of the method, the road user groups in method step c) can be selected from the group consisting of pedestrians, electric scooters, electric or non-electric motorbikes, cars and trucks. This division into other road users can contribute to a particularly efficient consideration of the different movement profiles, and thus to a particularly significant consideration of risks. The number of different classifications here is not too high, so that the current traffic situation can be represented in a simple yet significant model.

In a further, preferred embodiment of the method, the sensors in method step a) can be selected from the group consisting of optical sensors, lidar, radar, GPS or combinations of at least two types of sensors. This selection of different sensors can contribute to a particularly efficient monitoring of the traffic situation in the context of the method according to the invention. The temporal resolution is also suitable for fast-moving objects, and, due to the quantities of data generated, the method according to the invention can contribute to a particularly high rise in the efficiency.

A driving assistance system comprising at least a control unit, a front sensor and a side sensor is, furthermore, in accord with the invention, wherein the control unit is in electrical contact with the sensors, and wherein the control unit is configured to carry out the method according to the invention. In particular, the driving assistance system can furthermore comprise a GPS module, wherein the control unit is then also in electrical contact with the GPS module. The method according to the invention is in particular suitable for being carried out in the context of a driving assistance system. The method can, in particular, contribute to movement in the traffic zone becoming safer, wherein the risk of unwanted collisions is significantly reduced. The sensor arrangement given above in particular, in combination with the control unit, contributes to this. As regards the further advantages of the driving assistance system according to the invention, reference is furthermore made explicitly to the advantages of the method according to the invention.

A vehicle with a driving assistance system according to the invention is furthermore in accord with the invention. As regards the advantages of a vehicle according to the invention with a driving assistance system according to the invention, reference is in particular made to the advantages of the method according to the invention.

Further advantages and advantageous embodiments of the objects according to the invention are illustrated by the drawings, and explained in the following description. It should be noted here that the drawings merely have a descriptive character and are not intended to restrict the invention in any way.

In the drawings

Figure 1:
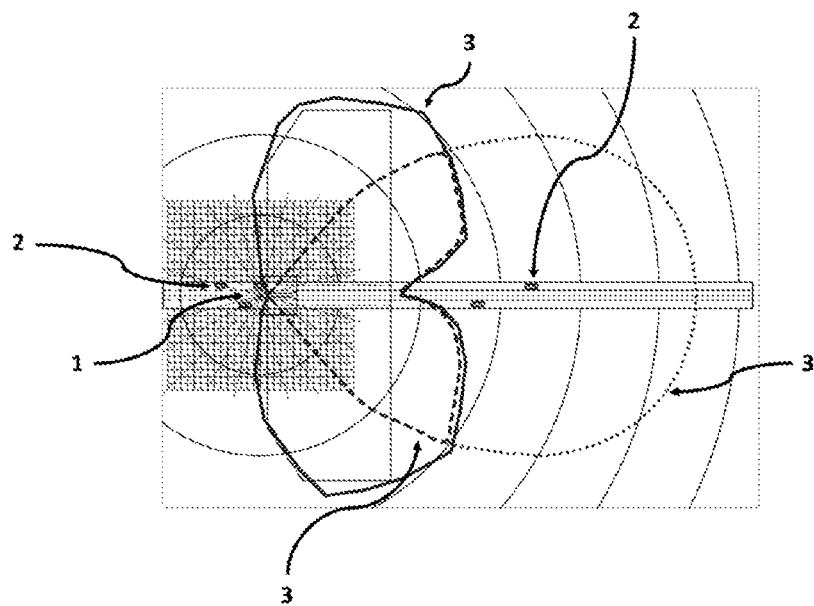
FIG. 1 shows a schematic illustration of a division according to the invention of a current traffic situation in different potentially occupied areas.

FIG. 1 shows a possible division of potentially occupied areas for a moving vehicle 1 on a roadway. Other road users 2 are located in the near surroundings of the moving vehicle 1. The division of the road layout, and thereby the close vehicle surroundings, for example into three different potentially occupied areas 3, is illustrated. The individual potentially occupied areas 3 extend symmetrically with respect to the vehicle axis in the direction of travel in each case. One potentially occupied area 3 extends essentially forward in the direction of travel in which more distant road users 2 are located. The potentially occupied area 3 has a club-like shape. The potentially occupied area 3 can, for example, extend to a range up to 175 m in the direction of travel of the moving vehicle 1, and can, for example, be monitored by lidar or radar sensors 12, 13. A second potentially occupied area 3 can, for example, cover a medium distance from the moving vehicle 1, wherein, for example, particular attention is given to the side areas. This area accordingly does not have the shape of a club, but rather has a shape similar to a butterfly. The third potentially occupied area 3 can, for example, include the second potentially occupied area 3 and, in addition, also the side areas of the moving vehicle 1. The lateral extent of this third area 3 is, for this reason, greater than the extent in the forward direction. The lateral extent of this area can, for example, be 100 m.

Figure 2:
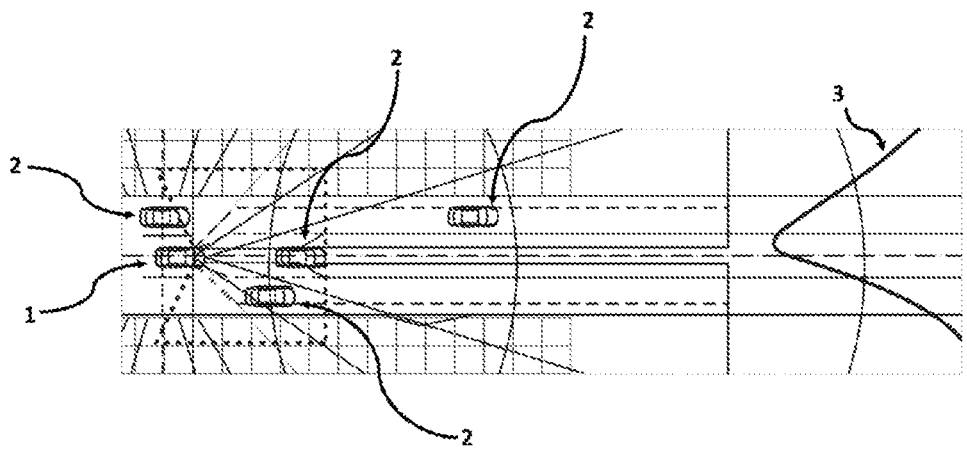
FIG. 2 shows a further schematic illustration of a division according to the invention of a current traffic situation in different potentially occupied areas.

FIG. 2 shows an excerpt of a close area of FIG. 1. It illustrates that other vehicles 2 are on the roadway relative to the moving vehicle 1, wherein the vehicles 2 can be assigned to one or more potentially occupied areas 3.

Figure 3:
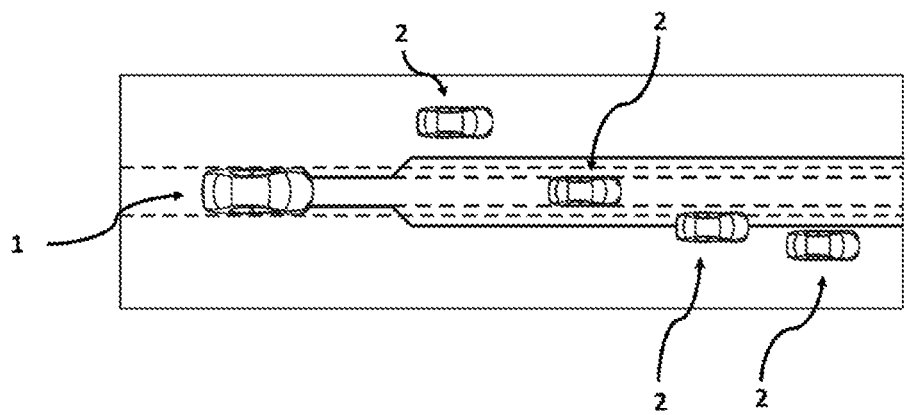
FIG. 3 shows a schematic illustration of a division according to the invention of a current traffic situation in different potentially occupied areas.

FIG. 3 shows an excerpt of FIG. 1 and FIG. 2. The moving vehicle 1 is shown with an excerpt of the vehicle surroundings, wherein the vehicle 1 is traveling on a straight road. The moving vehicle 1 is fitted with sensors for monitoring the surroundings, and with a GPS sensor 11, not illustrated. A situationally adapted division of the potentially occupied areas 3 can be made on the basis of the current speed of the moving vehicle 1, the GPS position and thereby the current road situation. On the basis of the current vehicle speed of the moving vehicle 1, a classification can, for example, contain only the car, motorcycle or truck groups, excluding pedestrians and cyclists. A potentially occupied area 3 is, for example, shown by the solid lines, and a further potentially occupied area shown by the dashed lines. The vehicles 6 and 5 are located outside the two areas, and a lower priority can consequently be assigned to these vehicles 2. The vehicle 7 is located half inside one of the potentially occupied areas, and, on the basis of the current direction of movement of the vehicle 7, a higher priority can additionally be assigned to it.

The vehicle 4 is located both in potentially occupied area 2 as well as 3, and for that reason the highest priority can be assigned to this vehicle 2.

Figure 4:
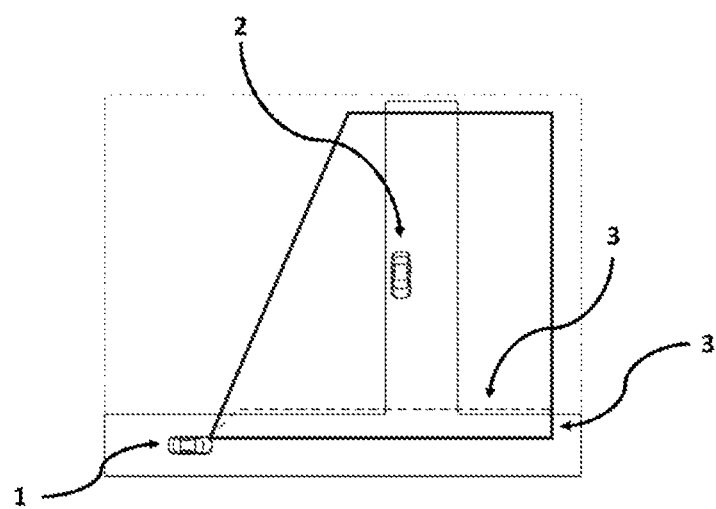
FIG. 4 shows a schematic illustration of a division according to the invention of a current traffic situation in different potentially occupied areas.

FIG. 4 shows a different traffic situation for the moving vehicle 1, for example in an inner-city area. A road layout in which a road joins a straight road from the left is shown.

On the basis of this road layout, the potentially occupied areas 3 can be chosen such that the areas to the sides of the direction of travel of the moving vehicle 1 are primarily covered. One area can cover the near area and another area can cover the far area. In this embodiment, only vehicles 2, for example, receive a high priority, and objects classified as pedestrians and cyclists are omitted from the further consideration due to their low priority. The vehicle 2 for this reason is given a high priority, since it is in the potentially occupied area 3 and has been classified as belonging to the group of vehicles. The collision probability is calculated on the basis of this classification, and a braking procedure can be initiated autonomously for the moving vehicle 1 on the basis of the relative speeds.

Figure 5:
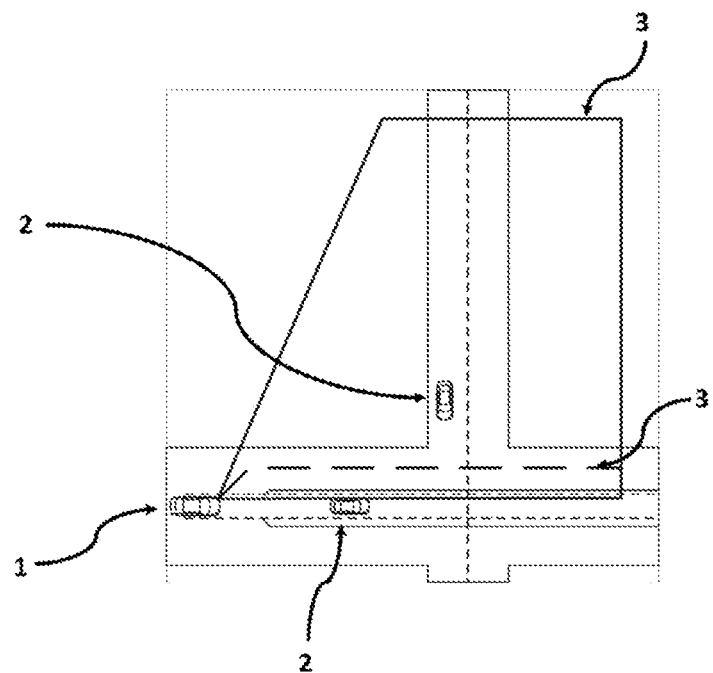
FIG. 5 shows a schematic illustration of a division according to the invention of a current traffic situation in different potentially occupied areas.

FIG. 5 also shows an inner-city driving situation, wherein the moving vehicle 1 and another object classified as a vehicle 2 are moving with comparable speed but with sufficient distance from one another. Another vehicle 2 approaches from the left at high speed from another potentially occupied area 3. On the basis of the definition of the potentially occupied areas 3, the classification of the objects, and the relative motion of the individual objects, a higher priority can consequently be assigned to the vehicle 2 on the left, wherein calculation of the collision probability with this object is performed as a priority. On the basis of the calculated collision probability, the moving vehicle 1 can be accelerated or braked, in order to avoid a possible collision.

Figure 6:
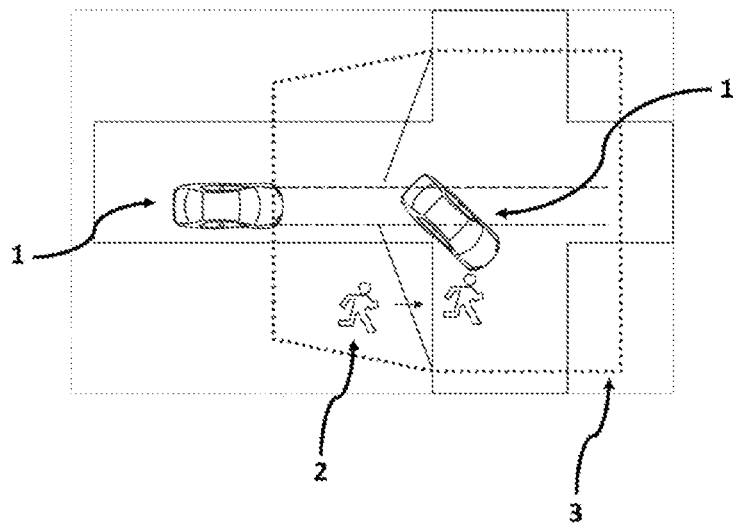
FIG. 6 shows a schematic illustration of a flow diagram according to the invention for the method according to the invention.

FIG. 6 shows a further traffic situation in an inner-city area, wherein a turning situation is about to arise for the moving vehicle 1. The latter can result, for example, from a combination of the speed and the actuation of a turn indicator. A possible division into different potentially occupied areas 3 is shown by the differently formatted lines. On the basis of the speed and of the flashing, only objects classified as pedestrians 2 are given a high priority. In addition to the prioritization, the direction of movement and speed of movement can also be used to determine the final priority. If the moving vehicle 1 is traveling straight forward, the pedestrian 2 can be given a lower priority even though it is in the potentially occupied area and in the correct class. The situation changes, of course, in the event that the moving vehicle 1 turns, as described above.

Figure 7:
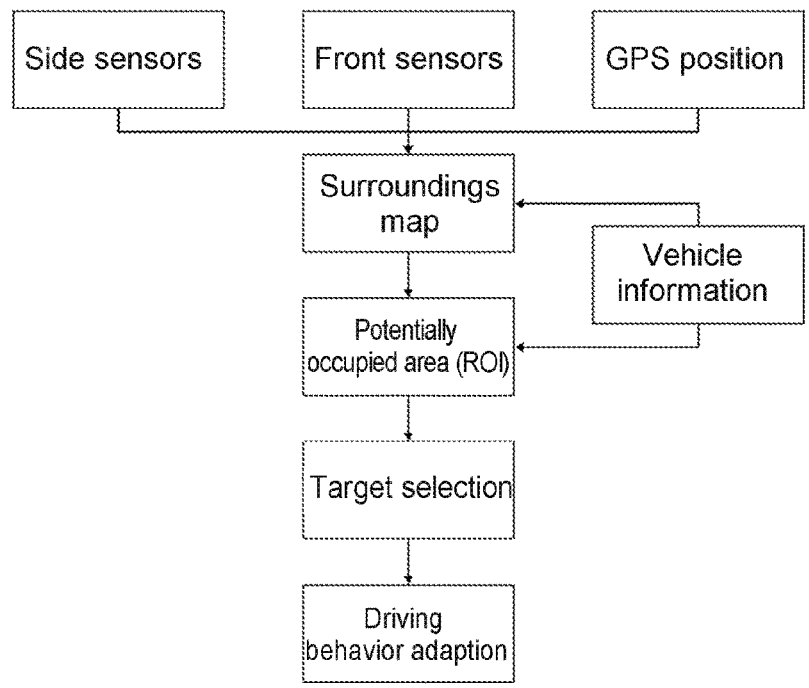
FIG. 7 shows a schematic illustration of a vehicle with a driving assistance system according to the invention.

FIG. 7 shows schematically a possible flow diagram of the method according to the invention. A digital image of the surroundings map is prepared using various sensors 12, 13 and the determination of the GPS position 11. The sensor types 12, 13 listed here each enable the monitoring of different surrounding areas of the vehicle 1. Radar or lidar sensors, for example, may be considered as possible sensors 12, 13. Amongst other things, the surroundings map here contains information about the current position of the moving vehicle 1, possible road users 2 in the surroundings of the vehicle 1, the road layout including crossings, junctions, cycle paths, traffic signs and so forth. The potentially occupied areas ROI 3 adapted to the current driving situation are specified as a function of the surroundings map and of vehicle information that is available, such as for example the speed or possible changes in direction of the moving vehicle 1 indicated by turn indicators or steering movements. An assignment of the other road users to the respective potentially occupied areas then takes place on the basis of the potentially occupied areas 3. The assignment is based on the local coordinates of the other road users 2 and on the local coordinates of the respective potentially occupied areas 3. The other road users 2 that are sorted into the individual potentially occupied areas 3 are then classified and prioritized on the basis of the classification and of the potentially occupied area 3 being considered. A collision probability is then calculated for the other road users 2 as a function of the potentially occupied area 3 and the prioritization that has been made, staged in accordance with the prioritization. It is possible that no calculation of the collision probability occurs within the method for road users 2 with a low priority, since, on the basis of the specified potentially occupied area 3 and the classification of these road users 2, there is no risk of collision. Further criteria, such as the current driving behavior of the moving vehicle 1, or the current movement profile of the other road users 2, can furthermore be used for fine adjustment of the prioritization. Either a warning can then be output, or the driving behavior of the moving vehicle 1 can be changed, as a function of the collision probability that is obtained. The latter can, for example, be done by changing the direction of travel or through a braking procedure.

Figure 8:
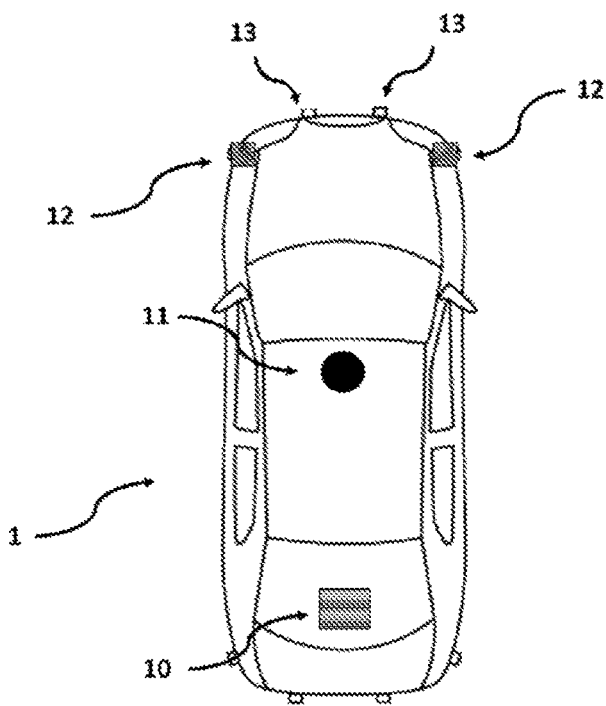
FIG. 8 shows a schematic of a vehicle with a driving assistance system in accordance with one or more embodiments.

FIG. 8 shows schematically an embodiment according to the invention of a vehicle 1 according to the invention with a driving assistance system according to the invention. A vehicle that has front 12 and side sensors 13, as well as a GPS module 11 for determination of the position, is illustrated. The current classification on a roadmap, which defines the road surroundings of the current position of the vehicle, can, for example, also take place using the GPS module 11. Thus, for example, the road layout and the presence of junctions, crossings or speed limits, can influence the selection of the spatial extent and position of the potentially occupied areas. The vehicle further comprises a control unit 10 in the form of an ECU (electronic control unit) 10, and the individual components of the system are electrically connected to one another, at least via the control unit 10. The ECU 10 is configured to carry out the necessary steps of the method according to the invention and, using the sensor data and the current traffic situation, to make a selection between the different road users 2, so that, for example, only the users 2 with which there is an immediate risk of collision are treated by the collision monitoring system.

LIST OF REFERENCE SIGNS

1 Moving vehicle
2 Further road user
3 Potentially occupied area
10 ECU
11 GPS module
12 Side sensors
13 Front sensors

The invention claimed is:

1. A method for avoiding collisions of a moving vehicle with other road users in surroundings of the vehicle, comprising:
 a) detecting, by one or more sensors, the vehicle surroundings and the other road users located therein;
 b) dividing the vehicle surroundings into a plurality of potentially occupied areas;
 c) classifying the other road users detected in method step a), wherein, by the classification, at least one road user group is assigned to each of the other road users;

d) prioritizing the road users classified in method step c), taking into consideration both the classification carried out in method step c) and the potentially occupied area defined in method step b), wherein road users from one or more predetermined road user groups in a particular potentially occupied area are given a high priority and road users from other, non-predetermined road user groups in the particular potentially occupied area are given a lower priority;

e) determining a probability of collision of the other road users with the vehicle, wherein the collision probability is determined in accordance with the prioritization carried out in method step d) and the collision probability of the other road users having a high priority is determined first; and f) changing or maintaining a current driving behavior of the vehicle on a basis of the collision probabilities determined in method step e).

2. The method as claimed in claim 1, wherein a division of the potentially occupied areas in method step b) takes place making use of a surroundings map of the current vehicle surroundings of the vehicle.

3. The method as claimed in claim 1, wherein a division of the vehicle surroundings in method step b) takes place as a function of a speed of the vehicle.

4. The method as claimed in claim 1, wherein a division of the vehicle surroundings in method step b) takes place symmetrically with respect to a vehicle movement direction in at least 3 different potentially occupied areas.

5. The method as claimed in claim 1, wherein the prioritization of the other road users in method step d) takes place additionally while giving consideration to a current movement profile of the other road user.

6. The method as claimed in claim 1 wherein the determination of the collision probability in method step e) is only carried out for further road users having a high priority.

7. The method as claimed in claim 1, wherein the road user groups in method step c) are selected from the group consisting of pedestrians, electric scooters, electric or non-electric motorbikes, cars and trucks.

8. The method as claimed in claim 1, wherein the sensors in method step a) are selected from the group consisting of optical sensors, lidar, radar, and GPS, or combinations of at least two types of sensors.

9. A driving assistance system comprising:
a control unit;
a front sensor; and
a side sensor,
wherein the control unit is in electrical contact with the sensors,
wherein the control unit is configured to perform a method comprising:
detecting, by the front or side sensor, vehicle surroundings and other road users located therein;
dividing the vehicle surroundings into a plurality of potentially occupied areas;
classifying the detected other road users to assign at least one road user group is to each of the detected other road users;
prioritizing the road users, based on the classification and the potentially occupied area, wherein road users from one or more predetermined road user groups in the potentially occupied area are given a high priority and road users from other, non-predetermined road user groups in the potentially occupied area are given a lower priority;
determining a probability of collision of the other road users with the vehicle, wherein the collision probability is determined in accordance with the prioritization and the collision probability of the other road users having a high priority is determined first; and
changing or maintaining a current driving behavior of the vehicle on a basis of the collision probability.

10. The driving assistance system as claimed in claim 9, further comprising a GPS module, wherein the control unit is in electrical contact with the GPS module.

11. A vehicle with a driving assistance system as claimed in claim 10.

* * * * *